(12) United States Patent
Allidieres

(10) Patent No.: US 8,091,593 B2
(45) Date of Patent: Jan. 10, 2012

(54) METHOD AND DEVICE FOR FILLING A TANK WITH A PRESSURIZED GAS

(75) Inventor: Laurent Allidieres, Saint Martin d'Uriage (FR)

(73) Assignee: L'Air Liquide Societe Anonyme pour l'Etude et l'Exploitation des procedes Georges Claude, Paris (FR)

( * ) Notice: Subject to any disclaimer, the term of this patent is extended or adjusted under 35 U.S.C. 154(b) by 796 days.

(21) Appl. No.: 12/088,620

(22) PCT Filed: Jul. 31, 2006

(86) PCT No.: PCT/FR2006/050767
§ 371 (c)(1), (2), (4) Date: Sep. 5, 2008

(87) PCT Pub. No.: WO2007/036651
PCT Pub. Date: Apr. 5, 2007

(65) Prior Publication Data
US 2009/0151812 A1   Jun. 18, 2009

(30) Foreign Application Priority Data
Sep. 28, 2005  (FR) ...................................... 05 52911

(51) Int. Cl.
*B65B 3/22*   (2006.01)

(52) U.S. Cl. .......................... 141/82; 62/50.3; 222/146.1
(58) Field of Classification Search ................. 141/1, 4, 141/37, 54, 56, 82, 234, 285; 62/50.2, 50.3; 222/146.1
See application file for complete search history.

(56) References Cited

U.S. PATENT DOCUMENTS

| | | | |
|---|---|---|---|
| 5,832,906 | A | 11/1998 | Douville et al. |
| 7,128,103 | B2 * | 10/2006 | Mitlitsky et al. ............... 141/248 |
| 7,448,213 | B2 * | 11/2008 | Mitani ............................ 60/616 |
| 2003/0021743 | A1 | 1/2003 | Wikstrom et al. |
| 2005/0000802 | A1 | 1/2005 | Hobbs |
| 2005/0016185 | A1 | 1/2005 | Emmer et al. |

FOREIGN PATENT DOCUMENTS
EP          1500864          1/2005
* cited by examiner Primary Examiner — Gregory Huson
Assistant Examiner — Jason Niesz
(74) Attorney, Agent, or Firm — Christopher J. Cronin

(57) ABSTRACT

Method for filling a tank with a pressurized gas, in particular a vehicle tank with hydrogen, including the step of compressing the gas from a first gas source in order to fill said tank directly or via at least one buffer vessel, wherein the compression step is carried out using the energy from a working fluid, said method being characterized in that it comprises a step of heat exchange between said compressed gas and said working fluid.

13 Claims, 3 Drawing Sheets

US 8,091,593 B2

METHOD AND DEVICE FOR FILLING A TANK WITH A PRESSURIZED GAS

This application is a 371 of International PCT Application PCT/FR2006/050767, filed Jul. 31, 2006.

BACKGROUND

The present invention relates to a method and a device for filling a tank with a pressurized gas, particularly for filling a vehicle fuel tank with hydrogen.

The invention more specifically relates to the filling of a tank with pressurized gas, comprising a step of compressing the gas originating from a first gas source to fill the tank directly or via at least one buffer vessel, the compression step being performed by using the energy of a working fluid.

There are numerous industrial constraints governing the filling of tanks with pressurized gas, especially when the gases need to be stored at high pressures (for example 500 bar or 700 bar or higher).

Storing gaseous hydrogen at high pressures is particularly important when this hydrogen is to be used in motor vehicles. In addition, in this application in particular, the relative speed with which the tank can be filled is an important factor. This is because filling hydrogen tanks onboard vehicles fitted with fuel cells or internal combustion engines running on hydrogen needs to be able to be done in a few minutes at most. Filling needs to be controlled with care because rapid pressurizing of the gas causes it to heat up and this heating may become incompatible with the material of which the tank is made.

In order to solve this problem, one known solution is to provide a cooling plant at the filling station. This solution requires infrastructures which are extensive and expensive in terms of power consumption in particular. Another solution is to control the filling rate according to the temperature of the gas in the tank. However, this solution has the disadvantage of lengthening the time taken to fill the tank.

It is one object of the present invention to alleviate all or some of the abovementioned disadvantages of the prior art.

To these ends, the method according to the invention, in other respects according to the generic definition given thereof in the above preamble is essentially characterized in that it comprises a step of heat exchange between the compressed gas and the working fluid.

Furthermore, the invention may have one or more of the following features:

- the heat exchange step is performed using working fluid before it is used to compress the gas and/or working fluid which is not used to compress the gas,
- the step of heat exchange between the compressed gas and the working fluid is performed indirectly via a carrier or a cold accumulator,
- the method comprises an intermediate filling step which consists in compressing the gas originating from the first source and in supplying at least one buffer vessel with said compressed gas, and in that it comprises an intermediate step of heat exchange between the working fluid and the carrier or heat accumulator, the intermediate heat exchange step being performed during or over a space of time close to the intermediate filling step,
- the method comprises a step of filling the tank from at least one buffer vessel and in that it comprises a step of heat exchange between the carrier or heat accumulator and the pressurized gas after it has left the vessel and before it enters the tank.

The invention also relates to a device for filling a tank with a pressurized gas, particularly for filling a vehicle fuel tank with hydrogen, for implementing the method as claimed in any one of the preceding features, comprising at least one source of gas at a first pressure, compression means actuated by a working fluid and able to compress the gas originating in particular from the first gas source, a source of working fluid for supplying and controlling the gas compression means, characterized in that it comprises heat exchange means able to perform heat exchange between the compressed gas and the working fluid.

According to other specific features:

- at least one buffer vessel able, on the one hand, to be supplied with compressed gas by the compression means and, on the other hand to supply a tank with compressed gas, the device comprising connection means intended to be connected to a tank so as to deliver to the tank compressed gas originating selectively either directly from the compression means or from a buffer vessel, and in that the heat exchange means are positioned upstream of the connection means so that they can be supplied with compressed gas originating from the compression means or from a buffer vessel,
- the heat exchange means are able to perform indirect heat exchange between the compressed gas and the working fluid via a carrier or cold accumulator,
- the heat exchange means comprise a heat exchanger comprising a cold accumulator such as glycol water or aluminum,
- the compression means are of the pneumatic type in which the working fluid is in the gaseous state, the working fluid being stored in the source in liquefied form, and in that it comprises heating means, able to heat the working fluid as it leaves the source to above its boiling point before delivering it to the compression means,
- the means for heating the working fluid as it leaves the source comprise heat exchange means able to perform a heat exchange between the compressed gas and working fluid,
- the means of heating the working fluid as it leaves the source comprise the additional heat exchange means able to perform heat exchange between the working fluid and a hotter fluid, for example the air,
- the means for heating the working fluid as it leaves the source comprise the additional heat exchange means placed in series with the compressed gas/working fluid heat exchange means,
- the device comprises means for conveying the working fluid from its source to the gas compression means, the conveying means comprising selective diversion means able to cause the working fluid as it leaves the source to pass selectively via the compressed gas/working fluid heat exchange means and/or via the additional heat exchange means,
- the source of gas at a first pressure comprises a system for storing and/or generating gas, which system is sited at a fixed or mobile station,
- the device comprises at least two buffer vessels intended to store the compressed gas at two different pressures.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

Figure 1:
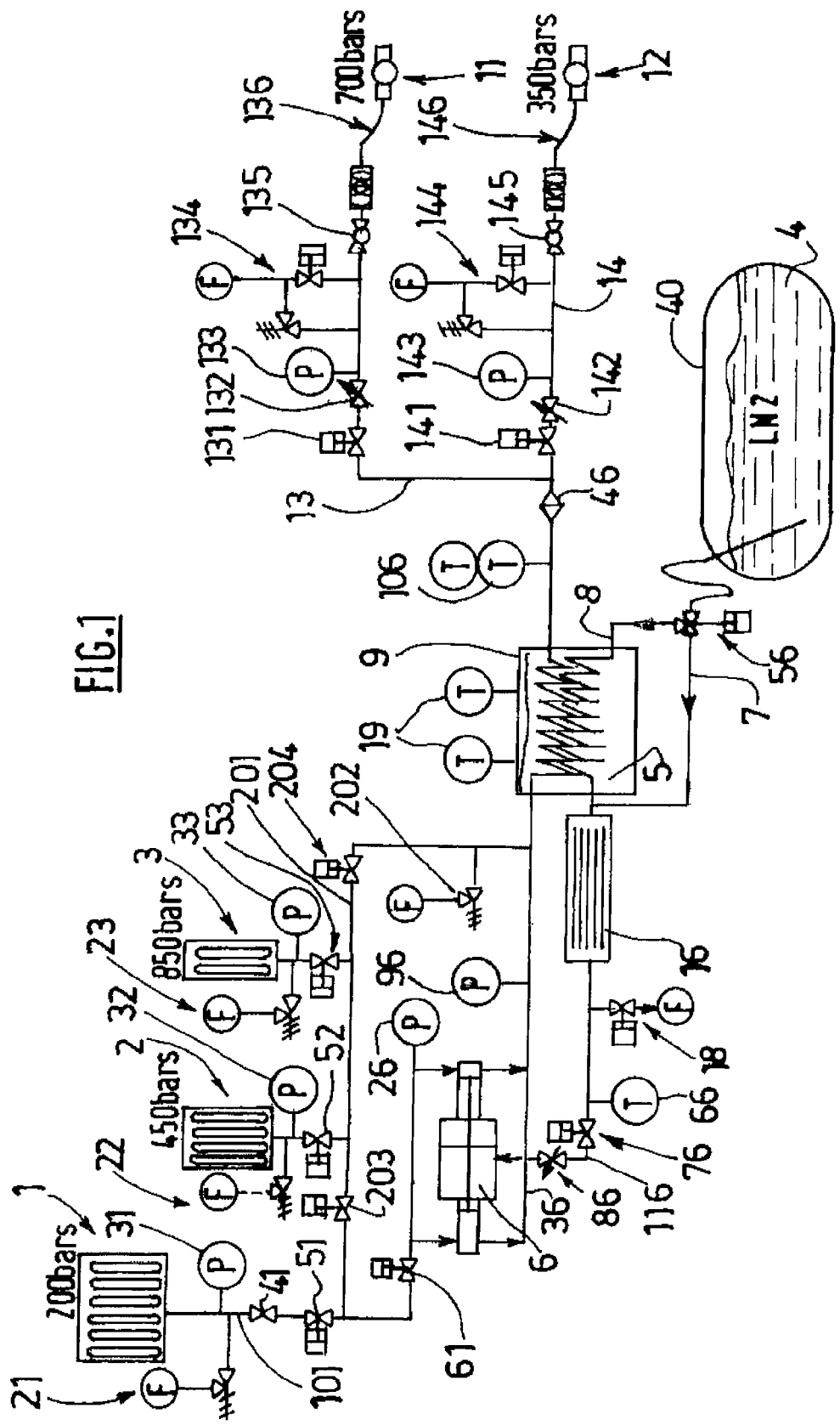
FIG. 1 is a schematic view illustrating the structure and operation of one example of a filling device according to the invention.

The device comprises three tanks or vessels 1, 2, 3 for gas. A first vessel 1 is, for example, a supply of hydrogen in cylinders at a pressure of 200 bar (or 300 bar or some other pressure) acting as a hydrogen supply. The first vessel 1 is, for example, a main source of hydrogen intended to supply the tanks 11, 12. For example, the first vessel 1 is a tank intended to be filled with hydrogen at a production site. Of course, the first vessel 1 may be fixed and/or associated with a fixed or mobile hydrogen production unit of the electrolyzer or natural gas reforming process type.

The second 2 and third 3 vessels are, for example, buffer tanks or buffer cylinder collections used during fillings with conventional cascade equalizing phases. For example, the second 2 may be intended to store hydrogen at a pressure of about 450 bar while the third 3 vessel stores the hydrogen at a pressure of about 850 bar.

The outlet of each vessel 1, 2, 3 is connected to a respective safety vent 21, 22, 23 these vents being able to allow the gas to be discharged to the atmosphere. The outlet of each vessel 1, 2, 3 comprises its own respective pressure sensor 31, 32, 33.

The outlet of the first vessel 1 (hydrogen source) is connected by a line 101 to a compressor 6 to supply the latter with gas intended to be compressed. The line 101 supplying the compressor 6 with gas has three valves 41, 51, 61 placed in series. A pressure sensor 26 is also provided, to measure the pressure of the gas entering the compressor 6.

The line 101 supplying the compressor 6 with gas comprises a first diversion line 201 which connects the first vessel 1 directly to the outlet line 36 of the compressor (that is to say to the line 36 containing the gas pressurized in the compressor 6). The first bypass line 201 is connected to the supply line 101 between the second 51 and third 61 in-series valves and has a safety vent 202.

The outlets from the second 2 and third 3 buffer vessels are each connected to the first bypass line 201 via respective valves 52, 53. A first valve 203 is positioned on the first bypass line 201 between the connection to the supply line 101 and the connection of the second buffer vessel 2. A second valve 204 is positioned on the first bypass line 201 between the connection of the third buffer vessel 2 and the connection of the supply line 101 to the outlet line 36 of the compressor 6.

The outlet line 36 of the compressor 6 comprises means 96 for sensing the pressure of the gas leaving the compressor 6. The outlet line 36 of the compressor then passes through a heat exchanger 9 described in greater detail hereinafter which allows the compressed gas to be cooled before it enters a tank 11, 12. Downstream of the exchanger 9, the outlet line 36 from the compressor is provided with means 106 for sensing the temperature of the compressed gas and with a particle filter 46. Downstream of the filter 46, the outlet line 36 is split into two parallel lines 13, 14 each able to be connected to a respective tank 11, 12 of a vehicle, so as to supply said tank with compressed gas (hydrogen) originating selectively either directly from the compression means 6 or from a buffer vessel 2, 3. As an alternative, the installation may have just one connection line 13 or 14, for example if the station allows filling to be performed at just one preferred pressure.

Each connection line 13, 14 respectively comprises, from the upstream end downstream (downstream side being the tank 11, 12 that is to be filled), a first valve 131, 141, then a calibrated orifice such as a manual or controlled needle valve 132, 142, and a pressure sensor 133, 143. Each connection line 13, 14 then comprises a double venting device 134, 144 (an automatic safety vent and a valve-controlled vent). The vents allow the gas (hydrogen) to be discharged from the circuit, for example into the atmosphere, if need be.

Downstream of the double vent device 134, 144, each line 13, 14 comprises an emergency shut-off valve 135, 145 and finally a system 136, 146 able to be coupled to means of reception on a tank (for example a hose (136, 146) ending in a quick coupling which can be connected to an inlet orifice of the tank 11, 12). Each connection line 13, 14 can be dimensioned to deliver gas at a determined pressure (for example 700 bar and 350 bar respectively).

The compressor 6 is preferably a pneumatic compressor and able to raise the pressure up to 1300 bar (preferably at least 850 bar). The compressor 6 is supplied in the conventional way with working gas which supplies the compression energy via a feed line 116, the upstream end of which is connected to a source 40 of working gas. The working gas for example powers the displacement of one or more pistons within the body of the compressor 6.

The working gas 4 is preferably nitrogen stored in cooled form within the source 40. As a preference, the nitrogen is stored in liquid form (cryogenic nitrogen) in the source tank 40. The liquid nitrogen 4 is taken from its source tank 40, by means, for example, of a dip tube or the like. At the outlet of the nitrogen source 40, the feed line 116 has a portion with two parallel lines 7, 8.

A first line 8 comprises a first heat exchanger 9. The second line 7 short circuits the first heat exchanger 9 and meets the first line 8 upstream of a second heat exchanger 16.

The first 9 and second 16 exchangers in series in the first line 8 are intended to heat the fluid leaving the source 40 so as to obtain gas. A device 18 that allows the working gas to be vented, for example, via a valve, is provided downstream of the two exchangers 9, 16.

The gas is routed between the first line 8 and the second line 7 by, for example, a three-way valve 56. Downstream of the second exchanger 16, the feed line 116 comprises means 66 for sensing the temperature of the working gas passing towards the compressor 6 and two valves 76, 86 in series and intended respectively to shut off the supply of working gas to the compressor 6 (and therefore stop the compressor) and to regulate the throughput of working gas (and therefore regulate the compression throughput).

The first exchanger 9 in the first line 8 constitutes the exchanger 9 situated on the outlet line 36 of the compressor 6. That means that the first exchanger 9 allows heat exchange between the working fluid 4 (nitrogen) and the compressed gas leaving the compressor 6 or leaving the vessels 1, 2 or 3. In this way, the first exchanger 9 allows the compressed gas to be cooled by setting up a heat exchange with the working fluid, which is colder. Typically, the temperature of the compressed gas leaving the compressor 6 is of the order of 120° C. The temperature of the gas leaving the vessels 1, 2 or 3 is approximately equal to ambient temperature while the temperature of the working fluid leaving the source is of the order of −196° C.

This heat exchange between the working fluid and the compressed gas may in particular heat the working fluid 4 leaving the source 4 with a view to evaporating it or may cool a refrigerating capability 5 of the exchanger 9 this capability consisting, for example, of a mass of aluminum or/and of glycol water.

As a preference, the first exchanger 9 performs the heat exchange between the compressed gas and the working fluid 4 indirectly, that is to say via a carrier or cold accumulator (or "frigorie" accumulator). For example, the exchanger 9 may for this purpose comprise a cold accumulator 5 such as glycol water, a mass of aluminum or any other equivalent means. The cold accumulator 5 is preferably dimensioned in such a way that its temperature is more or less uniform throughout at least one filling of one tank 11, 12.

The exchanger 9 may advantageously comprise sensors 19 sensing the temperatures of the fluids and/or of the "frigorie" accumulator within the exchanger 9.

The second exchanger 16 of the second line 9 is also intended to supplement the heating of the fluid leaving the source 40 so as to obtain gas, for example by heat exchange with the external air, so that it can be used in the compressor 6 as working fluid.

Thus, appropriate control of the valves 56, 18 on the supply line 116 allows the fluid leaving the source 40 to be distributed selectively in such a way that it is heated in the exchanger 16 of the first line so that it can be used as a working fluid in the compressor and also possibly heated in the exchanger 9, so as to regulate the temperature of the cold accumulator 5. Likewise, these valves 56, 18 make it possible to control the proportion of heated gas in this line 116 which is sent to the compressor 6 and/or to the exterior (via the vent device 18). In this way, the device allows the thermal power of the working fluid 4/compressed gas exchanger 9 and the heating of said working fluid 4 to be regulated so that it can be used in the compressor 6, and does so independently.

As a preference, the cooling of the compressed gas is rated to keep its temperature between −45° C. and ambient temperature.

In this way, the working fluid (nitrogen in this embodiment) is used to cool the gas (hydrogen in this example) and this same heated gas may be used to operate at least one compressor 6.

As described in greater detail hereinafter with reference to FIGS. 2 to 7, the transfer of cold from the working fluid in the exchanger 9 is performed preferably during the phase of filling a vessel 2, 3.

In order to simplify matters, in FIGS. 2 to 7 just some of the constituent parts of the device of FIG. 1 have been depicted. Those elements which are identical to those described hereinabove with reference to FIG. 1 are denoted by the same numerical references and are not described in detail again.

Furthermore, the first vessel 1 is depicted in the form of a hydrogen supply in a mobile station (such as a semitrailer for example).

Figure 2:
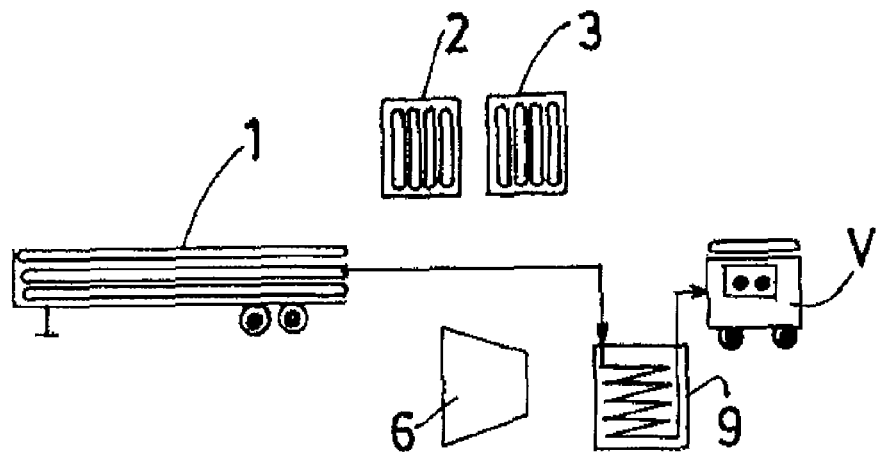
FIG. 2 is a schematic illustration of one of six steps in an example of the use of the filling device of FIG. 1.
Figure 3:
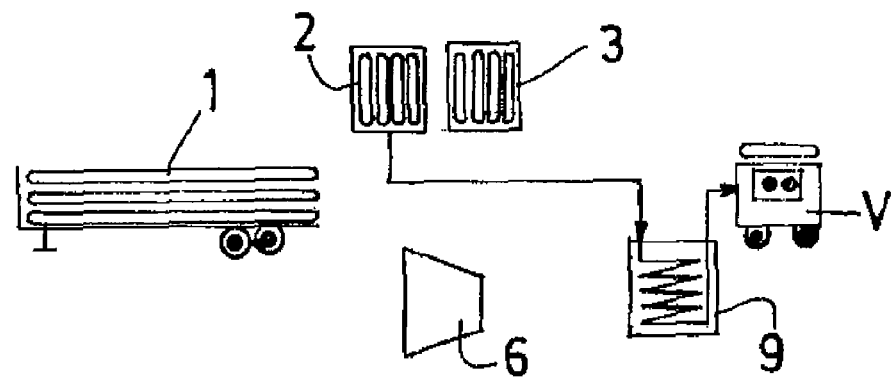
FIG. 3 is a schematic illustration of another of six steps in an example of the use of the filling device of FIG. 1.
Figure 4:
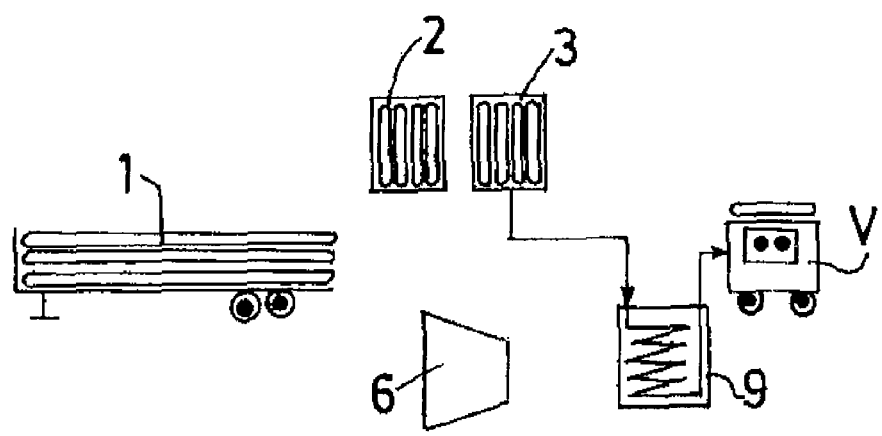
FIG. 4 is a schematic illustration of yet another of six steps in an example of the use of the filling device of FIG. 1.
Figure 5:
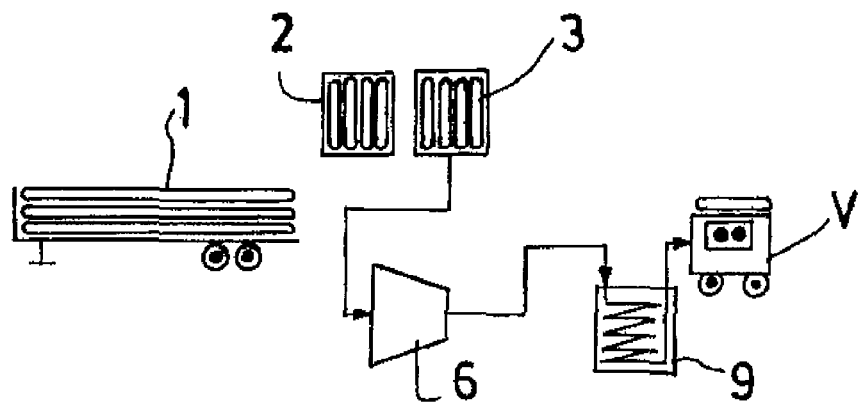
FIG. 5 is a schematic illustration of still another of six steps in an example of the use of the filling device of FIG. 1.
Figure 6:
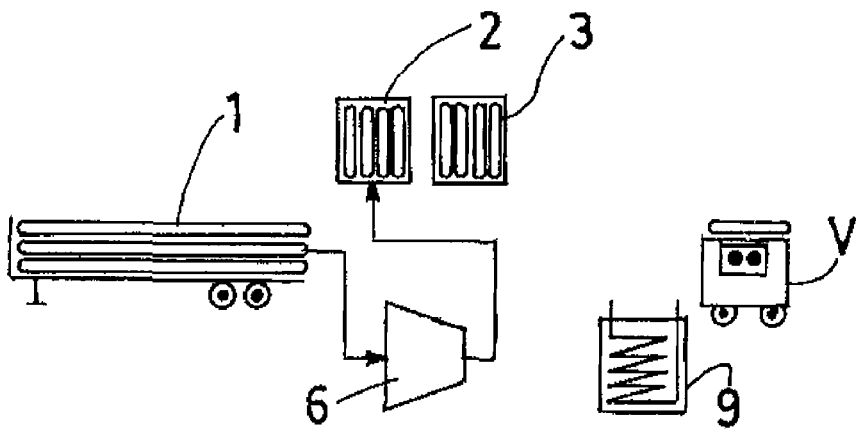
FIG. 6 is a schematic illustration of yet still another of six steps in an example of the use of the filling device of FIG. 1.
Figure 7:
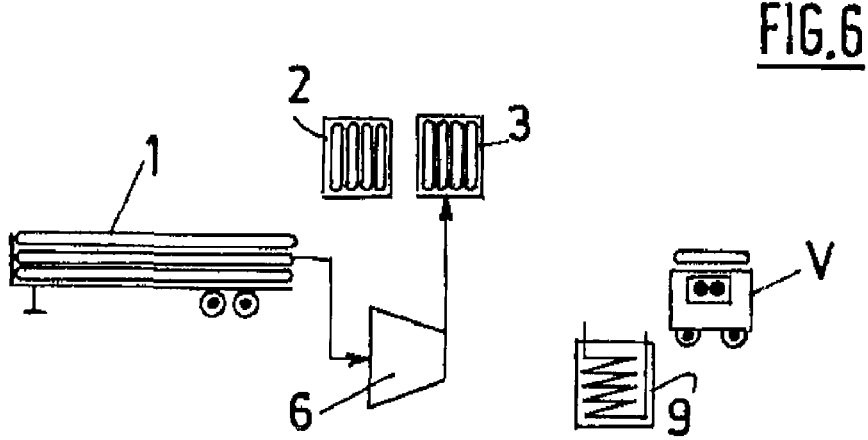
FIG. 7 is a schematic illustration of yet one more of six steps in an example of the use of the filling device of FIG. 1.

FIG. 2 depicts a step A during which the tank of a vehicle V is supplied, by equalizing pressures, with gas (hydrogen) stored in the first vessel 1 (for example at a pressure of 200 bar).

During a step B (FIG. 3), for example after the equalizing of step A, the tank of the vehicle V is supplied, with pressure equalizing, with gas stored in the second vessel 2 (for example at a pressure of 450 to 480 bar).

During a step C (FIG. 4), for example after the equalizing of step B, the tank of the vehicle V is supplied, with pressure equalizing, with gas stored in the third vessel 3 (for example at a pressure of the order of 850 bar).

During a step D (FIG. 5), additional filling may be performed, for example with equalizing of step C, by supplying the tank of the vehicle V with compressed gas taken directly from the compressor 6 at a determined pressure. During this optional additional filling, the compressor 6 may be supplied with gas from the third vessel.

As depicted in FIGS. 2 to 7, during all or some of steps A to E, the compressed gas may be cooled in the hydrogen/working fluid exchanger 9 before entering the tank of the vehicle V.

During a step E (FIG. 6), the second vessel 2 may be refilled with gas by the compressor 6 using gas taken from the first vessel 1.

During a step F (FIG. 7), the third vessel 3 may also be refilled with gas by the compressor 6 using gas taken from the first vessel 1.

As a preference, during steps E and F, cryogenic nitrogen (working fluid) is used to cool the cold accumulator 5 (bath of glycol water or aluminum) of the exchanger 9. The accumulator 5 is, for example, insulated at a temperature ranging between −45° C. and ambient temperature. Once it has evaporated, the nitrogen can be used to act as working fluid (or motive fluid) in the compressor 6. The working fluid 4 thus has a refrigerating and energy-carrying function.

During steps A to D the compressed hydrogen flows through the exchanger 9 which is cooled.

The exchanger 9 can therefore be cooled:
in advance, during steps E and F as described hereinabove,
or at the same time as the compressed gas flows through it (steps A to D), by opening the feed line 116 second line 8 working gas vent valve 18,
or in advance and simultaneously (steps A to F).

It will thus be readily understood that while being simple in structure, the invention presents numerous advantages. Specifically, the energy needed to compress and cool the gas is supplied by the same fluid. In addition, according to the invention there is no need to provide an electrically powered refrigerating unit, so a high-powered electrical energy supply can be avoided. The device according to the invention also has a very compact accumulator 5.

The hydrogen supply source 1 can also be a low-pressure source of the electrolyzer and/or reformer type. In this case, step A and the valve 203 are not needed.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for filling a tank with a pressurized gas, comprising a step of compressing the gas originating from a first gas source to fill the tank directly or via at least one buffer vessel, the compression step being performed by using the energy of a working fluid, characterized in that said method further comprises a step of heat exchange between the compressed gas and the working fluid.

2. The method of claim 1, characterized in that the heat exchange step is performed using said working fluid before said working fluid is used to compress the gas and/or a portion of said working fluid which is not used to compress the gas.

3. The method of claim 1, characterized in that the step of heat exchange between the compressed gas and the working fluid is performed indirectly via a carrier or a cold accumulator.

4. The method of claim 3, further comprising:
an intermediate filling step which consists of compressing the gas originating from the first source, and supplying at least one buffer vessel with said compressed gas; and
an intermediate step of heat exchange between the working fluid and the carrier or heat accumulator, the intermediate heat exchange step being performed during or close in time to the intermediate filling step.

5. The method of claim 4, further comprising:
a step of filling the tank from at least one buffer vessel; and
a step of heat exchange between the carrier or heat accumulator and the pressurized gas after said pressurized gas has left the vessel and before said pressurized gas enters the tank.

6. The method of claim 1, wherein the pressurized gas is hydrogen.

7. A device for filling a tank with a pressurized gas using said method of claim 1, comprising:
at least one source of gas at a first pressure;
compression means actuated by a working fluid and able to compress the gas originating in particular from the first gas source;
a source of working fluid for supplying and controlling the gas compression means; and
heat exchange means able to perform heat exchange between the compressed gas and the working fluid.

8. The filling device of claim 7, further comprising:
at least one buffer vessel able, on one hand, to be supplied with compressed gas by the compression means and, on the other hand, to supply a tank with compressed gas; and
connection means adapted for connection with the tank so as to deliver to the tank compressed gas originating selectively either directly from the compression means or from a buffer vessel, wherein the heat exchange means are positioned upstream of the connection means so that they can be supplied with compressed gas originating from the compression means or from a buffer vessel.

9. The filling device of claim 7, characterized in that the heat exchange means are able to perform indirect heat exchange between the compressed gas and the working fluid via a carrier or cold accumulator.

10. The filling device of claim 8, characterized in that the heat exchange means comprise a heat exchanger comprising a cold accumulator.

11. The filling device of claim 10, wherein the cold accumulator is glycol water.

12. The filling device of claim 10, wherein the cold accumulator is aluminum.

13. The filling device of claim 7, further comprising heating means, able to heat the working fluid as it leaves the source to above its boiling point before delivering it to the compression means, characterized in that the compression means are of the pneumatic type in which the working fluid is in the gaseous state and the working fluid being stored in the source in liquefied form.

* * * * *